United States Patent [19]

Yokota

[11] E Re. 30,728

[45] Reissued Sep. 1, 1981

[54] HIGH SPEED FOCUSING TELEPHOTO LENS

[75] Inventor: Hideo Yokota, Tokyo, Japan

[73] Assignee: Canon Kabushiki Kaisha, Tokyo, Japan

[21] Appl. No.: 15,644

[22] Filed: Feb. 27, 1979

Related U.S. Patent Documents

Reissue of:

[64] Patent No.: 4,068,929
Issued: Jan. 17, 1978
Appl. No.: 678,364
Filed: Apr. 19, 1976

[30] Foreign Application Priority Data

Apr. 23, 1975 [JP] Japan ..... 50-49384

[51] Int. Cl.[3] ..... G02B 9/60; G02B 9/62
[52] U.S. Cl. ..... 350/464; 350/465
[58] Field of Search ..... 350/177, 215, 216

[56] References Cited

U.S. PATENT DOCUMENTS 3,854,797 12/1974 Yokota ..... 350/214

FOREIGN PATENT DOCUMENTS 261736 5/1970 U.S.S.R. ..... 350/216

*Primary Examiner*—Paul A. Sacher
*Attorney, Agent, or Firm*—Toren, McGeady and Stanger

[57] ABSTRACT

This invention is directed to a telephoto lens. The telephoto lens comprises a positive front lens group which remains stationary during focusing and a negative rear lens group having a stationary sub-group and at least one movable sub-group. The movable sub-group has a positive refracting power with its front surface being convex toward the object. The stationary sub-group has a negative refracting power with its rear surface being concave toward the image. The movable sub-group is moved on the optical axis toward an object so as to cause said telephoto lens to focus an object at near distance from its focusing on an object at far distance.

29 Claims, 36 Drawing Figures

OBJECT DISTANCE ∞

OBJECT DISTANCE 6000

OBJECT DISTANCE ∞

OBJECT DISTANCE 6000

OBJECT DISTANCE ∞

OBJECT DISTANCE 6000

OBJECT DISTANCE ∞

OBJECT DISTANCE 6000

HIGH SPEED FOCUSING TELEPHOTO LENS

Matter enclosed in heavy brackets [ ] appears in the original patent but forms no part of this reissue specification; matter printed in italics indicates the additions made by reissue.

BACKGROUND OF THE INVENTION

This invention relates to the focusing of a telephoto lens, and, more particularly, to a telephoto lens including a rear lens group of which a component lens means is movable for focusing purposes.

In general, the focusing of telephoto lenses of the type having a positive front lens group and a negative rear lens group arranged in axially spaced relation thereto is performed by moving the entire lens system along the common optical axis, but the focusing can be otherwise achieved by moving either of the front and rear lens groups.

If the telephoto lens is made bodily movable for focusing, the amount of axial movement of the entire lens system throughout the focusing range tends to increase, and this in turn calls for increase in the weight and bulk of the lens and the driving torque of its focusing mechanism such as those including helicoid structure as well as in the production cost thereof, thereby it being made more difficult to keep the weight and bulk of the complete telephoto lens within easily manageable proportion.

In the case of a telephoto lens of the type in which the rear lens group is made movable for focusing, it is possible to minimize the dimensions of the focusing mechanism with improved manipulation thereof. Another advantage of this type telephoto lens is that the front lens group may be supported in fixedly secured relation to a camera body as the length between the front lens vertex and the image plane within the housing of the camera body is maintained constant, thereby minimizing the probability of producing a jiggle or oscillation of the image at the focal plane by small accidental motion of the lens and camera assembly which is otherwise encountered particularly when the objective lens of the camera is telephoto in nature.

On the other hand, this type of telephoto lens is susceptible to large variation of aberrations and particularly spherical aberration during focusing, and it is difficult to preserve high grade imagery throughout. This indicates how the solution was approached, i.e. that the focusing not cause a large variation of aberrations.

An example of this approach is described in U.S. Pat. No. 3,854,797 assigned to the same assignee as this application in which the rear lens group is divided into a plurality of sub-groups including a negative sub-group arranged nearer to the image plane to be axially moved toward the rear as the telephoto lens is focused for shorter object distances and another negative sub-group arranged on the object side of the first named sub-group to be axially moved toward the front as the focusing is effected in the same direction as above.

SUMMARY OF THE INVENTION

The present invention is concerned with an improvement of the focusing aspect of the telephoto lens over the prior art as in the above-identified U.S. patent. According to the present invention, the rear lens group is provided with movable lens means arranged to be axially moved in a single common direction when the telephoto lens is focused for either shorter or longer object distances, while nevertheless maintaining good aberration correction throughout the focusing range. For this reason, axial displacement of the movable lens means of the telephoto lens for focusing can be effected by a mechanism of simple structure as compared with a focusing mechanism for moving two movable sub-groups in opposite directions to each other at a time.

In the basic embodiment of the invention, a telephoto lens comprises a front lens group of positive refracting power and a rear lens group which includes a negative sub-group stationary during focusing behind the front lens group and at least one positive sub-group which is axially moved toward the front when the telephoto lens is focused for shorter object distances.

In order to provide for good stabilization of aberrations during focusing, it is preferred to design the rear lens group of the telephoto lens of the invention as follows. The movable sub-group having a positive refracting power is constructed from a plurality of lenses including a positive lens and a negative lens with the most convergent surface in this sub-group being convex toward the object. The stationary sub-group having a negative refracting power is arranged on the image side of the movable sub-group and the most divergent surface in the stationary sub-group is concave toward the image. In specific embodiments to be described later, the movable sub-group comprises a positive lens and a negative lens in this order from the front which may be either cemented together at their adjoining surfaces, or air-spaced from each other, the first refracting surface of this sub-group counting from the front having the smallest radius of curvature in this sub-group and being convex toward the front. The stationary sub-group comprises a positive lens and a negative lens in this order from the front, the rearmost surface having the smallest radius of curvature in this sub-group and being concave toward the image.

Although the invention has been outlined with reference to the specific embodiments thereof in which the most convergent surface is provided at the first surface of the rear lens group and the most divergent surface at the rearmost surface thereof, it will be understood that modifications therein may be effected without departing from the scope and spirit of the invention. For example, a large proportion of the positive or negative refracting power in each sub-group may be concentrated not on a single surface but, for example, on two surfaces. In this case, it does not always happen that the first and rear most surfaces coincide with the most convergent and divergent surfaces of the resultant rear lens group. When one sub-group is replaced by a plurality of sub-groups having a combined power equivalent thereto, the number of movable sub-groups will become two or more which may be moved in unison or in differential relation to each other. When this number is two, the amount of axial movement of the front movable sub-group is preferably larger than that of consecutive movement of the rear movable sub-group to facilitate the aberration correction.

DESCRIPTION OF THE PREFERRED EMBODIMENTS

Figure 1:
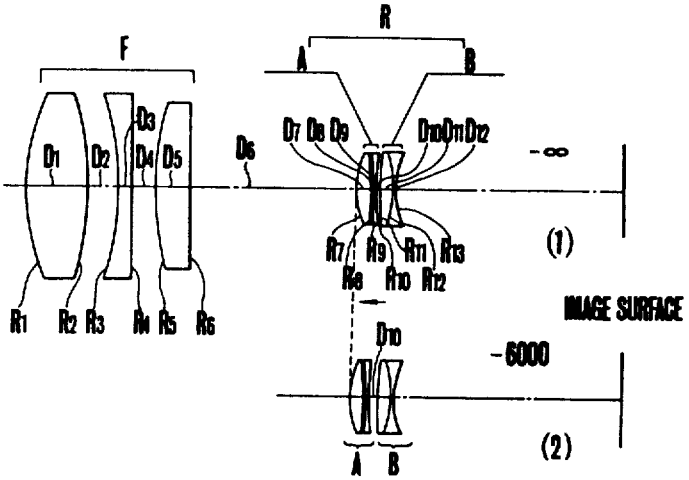
FIG. 1 is an optical diagram of an embodiment of a telephoto lens according to the present invention in two different focusing positions (1) and (2) for an infinitely distant object and for an object at 6 meters, respectively, of which various aberrational curves are shown in FIGS. 2A, 2B, 2C, 2D, and 3A, 3B, 3C, 3D respectively, provided that the numerical data of Example I are employed as the design parameter values therefor.
Figure 4:
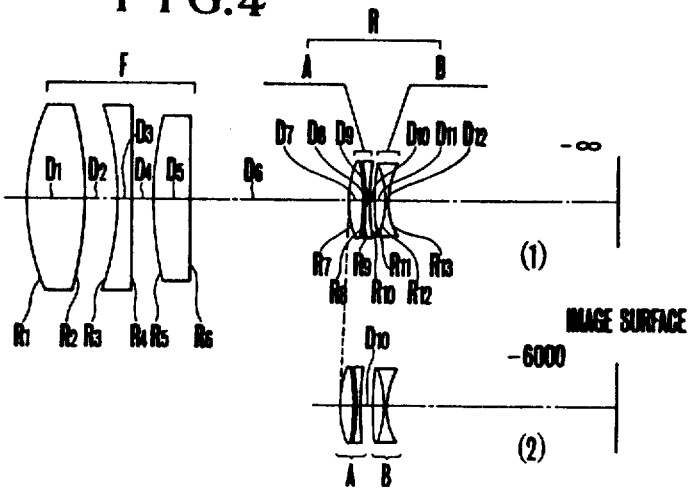
FIG. 4 is an optical diagram of another embodiment of a telephoto lens according to the invention of which various aberrational curves of infinitely and finitely distant objects are shown in FIGS. 5A, 5B, 5C, 5D and 6A, 6B, 6C, 6D respectively, provided that the numerical data of Example II are employed.
Figure 7:
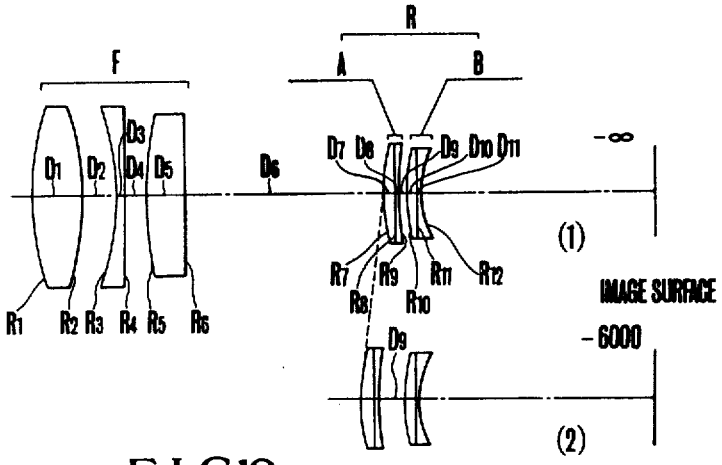
FIG. 7 is a similar diagram of another embodiment of the invention of which various aberrational curves for infinitely and finitely distant objects are shown in FIGS. 8A, 8B, 8C, 8D and 9A, 9B, 9C, 9D respectively, provided that the numerical data of Example III are employed.
Figure 10:
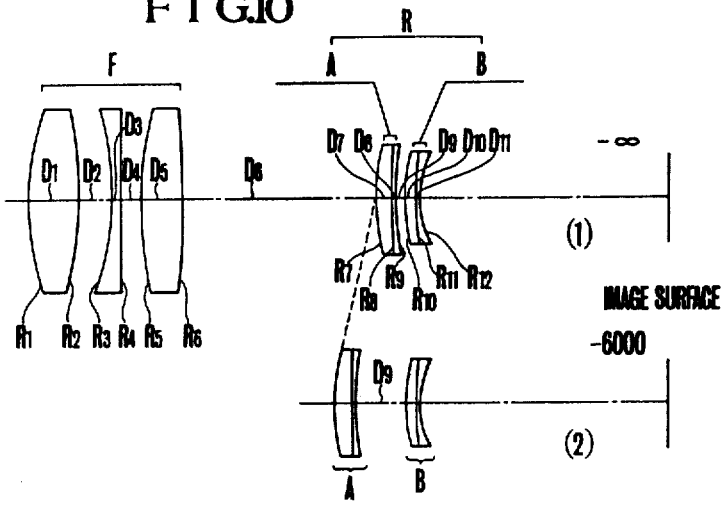
FIG. 10 is a similar diagram of another embodiment of the invention of which various aberrational curves for infinitely and finitely distant objects are shown in FIGS. 11A, 11B, 11C, 11D and 12A, 12B, 12C, 12D respectively, provided that the numerical data of Example IV are employed.

A telephoto lens having a focusing provision made at a sub-group constituting a part of the rear lens group thereof can be focused for shorter object distances by axially moving the sub-group toward the object or toward the image, depending whether it has a positive or negative power respectively. In the embodiments of the invention shown in FIGS. 1, 4, 7 and 10, the former method is employed. In these figures, the front lens group is designated at F, the rear lens group at R, a movable sub-group at A and a stationary sub-group at B.

As the sub-group having a positive refracting power, namely, the movable sub-group is moved toward the object, the incidence height of the axial ray at each lens surface of this sub-group is increased with production of negative spherical aberration. In this respect, the most convergent surface (R7) in this sub-group A must be disposed to be convex toward the object, or otherwise a large variation of spherical aberration with focusing might be resulted.

On the other hand, the forward convexity of the most convergent surface contributes to production of outwardly coma and negative astigmatism. To compensate this, it is necessary to dispose the most divergent surface (R12 or R13) as concave toward the image, or otherwise it would be made more difficult to achieve acceptable correction of coma and astigmatism.

Increasing refracting powers of the movable sub-group A decrease the amount of axial movement of it for focusing, but causing variation of spherical aberration to be increased. Conversely, when the sub-group A has a smaller refracting power, the larger the amount of axial movement of it and also the size of the complete telephoto lens traverse the optical axis are.

In order to achieve a good compromise between the requirements of minimizing the size of the sub-group A and of providing a high standard of stabilization of spherical aberration during focusing, therefore, the focal length of the movable sub-group A may lie between 0.2f and 2f, wherein f is the focal length of the overall telephoto lens when focused for an infinitely distant object. When the upper limit is violated, the lens diameter becomes too large, while when the lower limit is violated, a large variation of spherical aberration results.

For assisting toward stabilization of chromatic aberrations, it is desirable to chromatically correct the movable sub-group A and also the stationary sub-group B in themselves. Letting $Va_1$ denote the average Abbe number of materials from which the positive lenses in the movable sub-group A are made, Va2 the average Abbe number for the negative lenses therein, $Vb_1$ the average Abbe number of materials from which the positive lenses in the stationary sub-group B are made, and Vb2 the average Abbe number for the negative lenses therein, it is preferred that $Va_1 > Va2$; $Vb_1 < Vb2$.

Figures 2A, 2B, 2C:
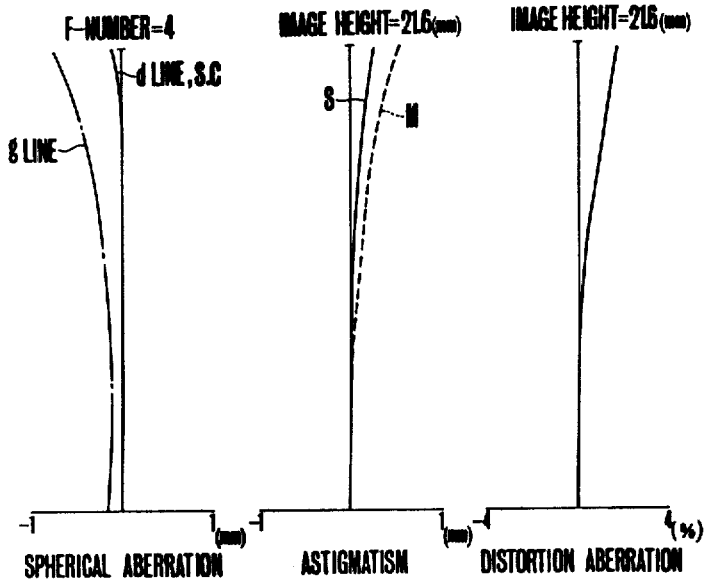
Figure 2D:
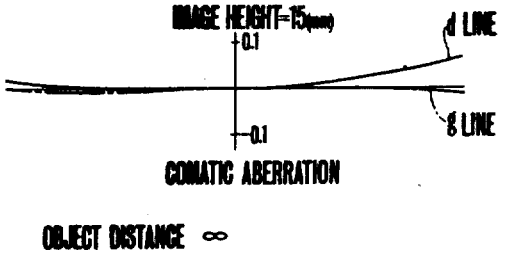
Figures 3A, 3B, 3C:
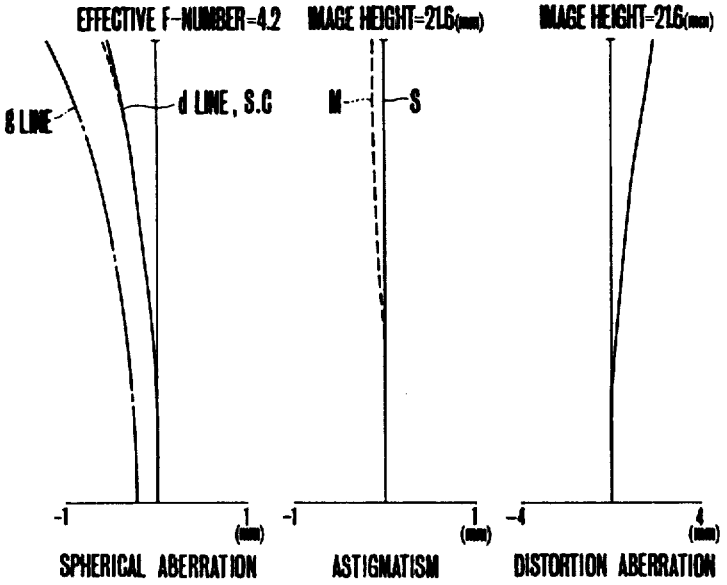
Figure 3D:
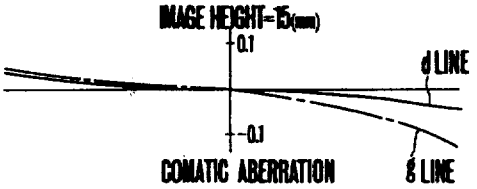
Figures 5A, 5B, 5C:
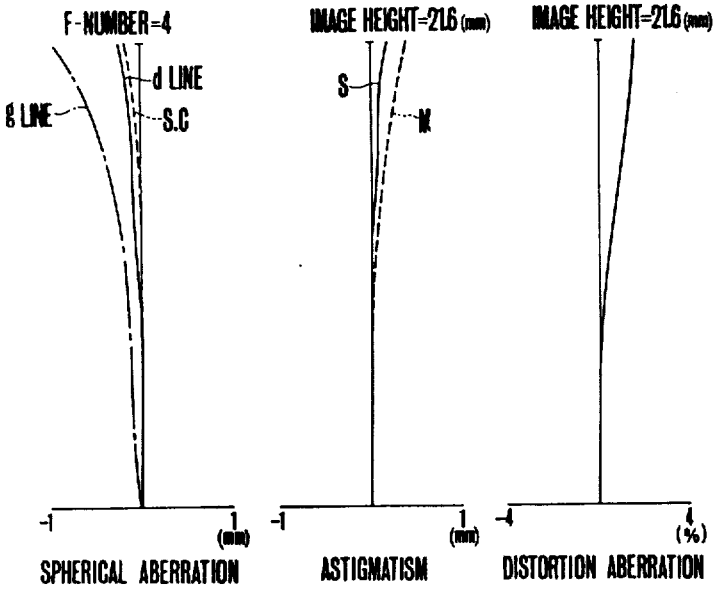
Figure 5D:
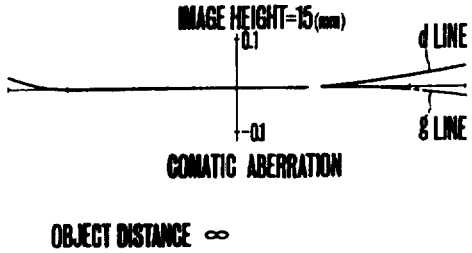
Figures 6A, 6B, 6C:
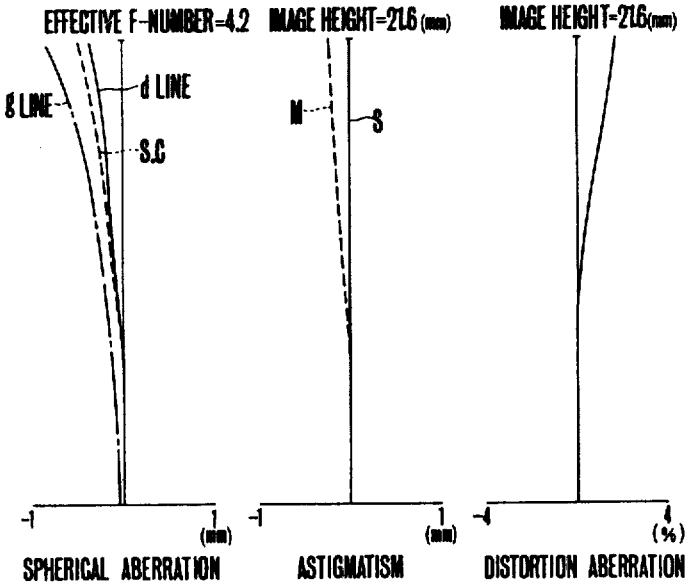
Figure 6D:
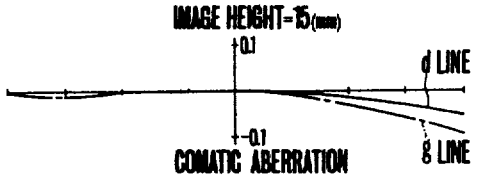
Figures 8A, 8B, 8C:
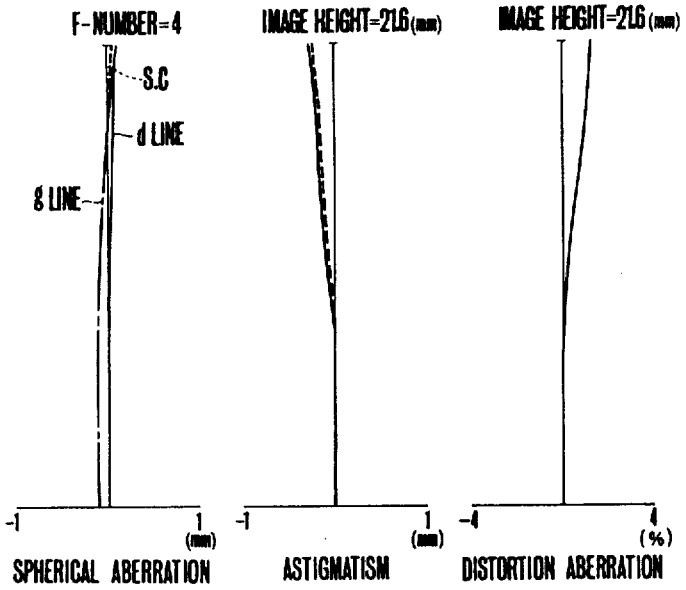
Figure 8D:
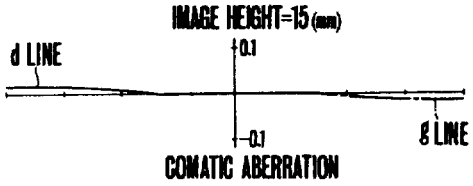
Figures 9A, 9B, 9C:
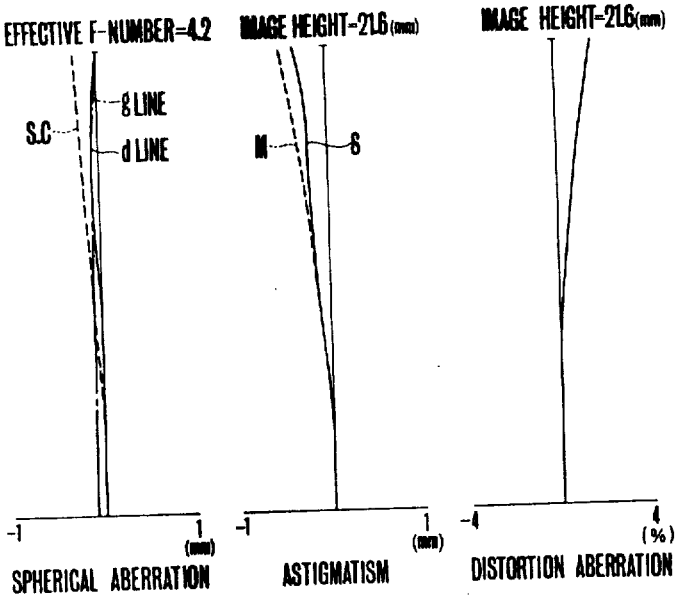
Figure 9D:
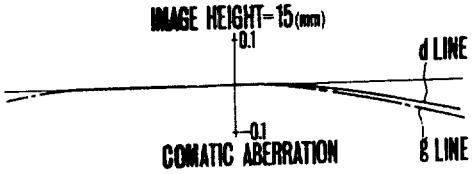
Figures 11A, 11B, 11C:
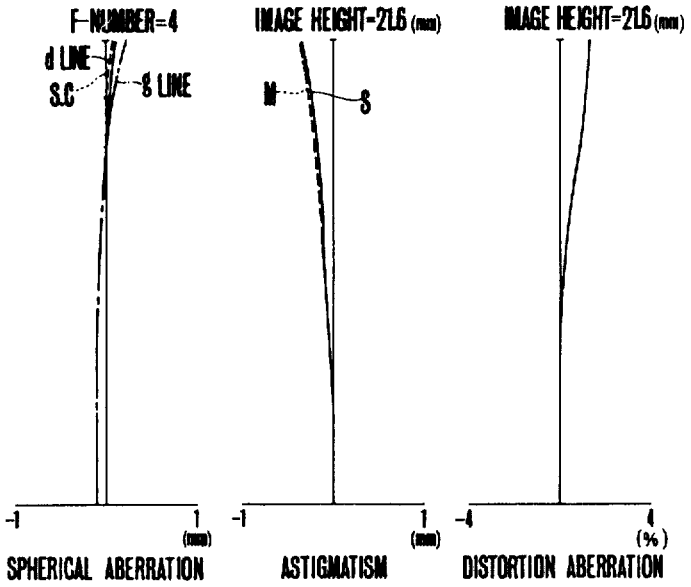
Figure 11D:
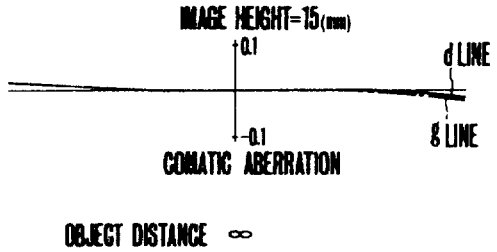
Figures 12A, 12B, 12C:
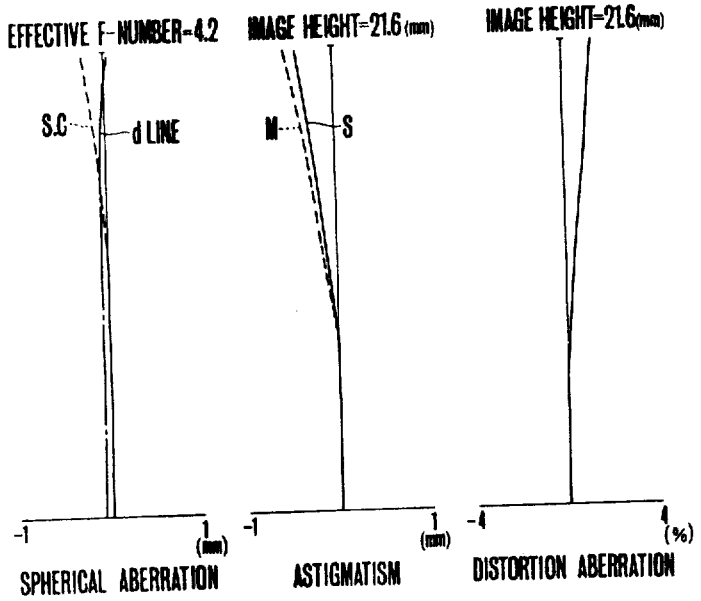
Figure 12D:
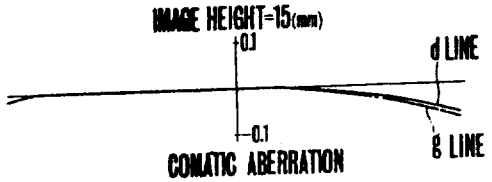

The four embodiments of the telephoto lens of the invention represented in FIGS. 1, 4, 7 and 10 may be constructed in accordance with the numerical data given in Tables 1, 4, 7 and 10 respectively, in which the radii of curvature, R, and the axial separations between the successive surfaces, D, along with the indices of refraction Nd for the spectral D line of sodium and the Abbe numbers vd for the various lens elements are all expressed in connection with the corresponding numbers counted from the front to the rear to identify the particular refracting surface, radius, separation, and lens element. The minus values of the radii, R indicate surfaces concave toward the front. In addition thereto, the variations of the axial air separations between the front lens group F and the movable sub-group A and between the movable sub-group A and the stationary sub-group B are given as the telephoto lens is focused from an infinitely distant object to an object at a distance of 6 meters measured from the image plane, provided that the values of the radii and separations in the Tables are taken in millimeter. The aberration coefficient of the telephoto lens of FIGS. 1, 4, 7 and 10 when focused for an infinitely distant object are given in Tables 2, 5, 8 and 11 respectively and those for an object at 6 meters are given in Tables 3, 6, 9 and 12 respectively in which L : axial chromatic aberration; T : lateral chromatic aberration; SA : spherical aberration; CM : coma; AS : astigmatism; PT : Petzval sum; and DS : distortion. In FIGS. 2A to 2D, there are graphically shown spherical aberration, astigmatism, distortion aberration and comatic aberration of the telephoto lens of FIG. 1(1) respectively for an infinitely distant object. In FIGS. 3A to 3D, there are shown various aberrations of the telephoto lens of FIG. 1(2) for an object at a distance of 6 meters measured from the image plane. FIGS. 5A to 5D show various aberrations of the telephoto lens of FIG. 4(1) for an infinitely distant object and FIGS. 6A to 6D show those of FIG. 4(2) for an 6 meter distant object. FIGS. 8A to 8D shows various aberrations of the telephoto lens of FIG. 7(1) for an infinitely distant object and FIGS. 9A to 9D show those of FIG. 7(2) for an 6 meter distant object. FIGS. 11A to 11D show various aberrations of the telephoto lens of FIG. 10(1) for an infinitely distant object, and FIGS. 12A to 12D show those of FIG. 10(2) for a 6 meter distant object.

EMBODIMENT I

Table 1, below, relates to a system having an overall focal length of f=286.3 with a sub-group A having a focal length of fa=80 and with a sub-group B having a focal length of fb=−53.1, a fack-focal length of BK=100.5, a F-number of F=4, and an image angle of $\omega=4.3°$.

TABLE 1

| Lens group | Subscript number | R | D | Nd | vd |
|---|---|---|---|---|---|
| | 1 | 102.622 | 26.63 | 1.43387 | 95.1 |
| Front | 2 | −175.716 | 13.88 | | |
| lens | 3 | −139.524 | 5.92 | 1.78590 | 44.1 |
| group | 4 | 2217.866 | 9.9 | | |
| | 5 | 166.212 | 15.84 | 1.48749 | 70.1 |
| | 6 | −1016.657 | *73.26 | | |
| | 7 | 41.348 | 5.5 | 1.7000 | 56.3 |
| Sub- | 8 | −151.406 | 0.97 | | |
| group | 9 | −130.593 | 1. | 1.72151 | 29.2 |
| A | 10 | 178.858 | *0.97 | | |
| | 11 | 300.489 | 4.5 | 1.72151 | 29.2 |
| Sub- | | | | | |
| group | 12 | −51.557 | 1. | 1.69350 | 53.3 |
| B | 13 | 31.571 | | | |

*Variable as with object at a distance of −6000 from the image plane $D_6$ = 71.24 BK = 100.5

$D_{10}$ = 2.99 f = 272.5

TABLE 4

EMBODIMENT II f = 293.9 BK = 104.42 F = 4 ω = 4.2° fa = 100 fb = −61.1

| Lens group | Subscript number | R | D | Nd | vd |
|---|---|---|---|---|---|
| Front | 1 | 102.802 | 25.54 | 1.43387 | 95.1 |
| lens | 2 | −176.087 | 13.92 | | |
| group | 3 | −139.762 | 6.06 | 1.78590 | 44.1 |
| | 4 | 2509.670 | 10.11 | | |
| | 5 | 159.176 | 15.70 | 1.48749 | 70.1 |
| | 6 | −995.393 | *70.24 | | |
| Sub- | 7 | 43.254 | 5.5 | 1.70000 | 55.3 |
| group | 8 | −149.054 | 1. | | |
| A | 9 | −128.438 | 1. | 1.72151 | 29.2 |
| | 10 | 122.084 | *1.25 | | |
| Sub- | 11 | 191.375 | 4.5 | 1.72151 | 29.2 |
| group | 12 | −51.161 | 1. | 1.69350 | 53.3 |
| B | 13 | 33.122 | | | |

*Variable as with object at a distance of −6000 from the image plane

TABLE 2

| | | | Aberration coefficient with object at infinity | | | | |
|---|---|---|---|---|---|---|---|
| No. | L | T | SA | CM | AS | PT | DS |
| 1 | 0.010323 | −0.007803 | 4.584036 | −3.464921 | 2.619020 | 0.844279 | −2.617793 |
| 2 | 0.011468 | −0.015671 | 13.275396 | −18.140920 | 24.789691 | 0.493078 | −34.549077 |
| 3 | −0.037641 | 0.049602 | −17.973540 | 23.685093 | −31.211639 | −0.903108 | 42.320031 |
| 4 | 0.003469 | −0.016035 | 0.024824 | −0.114753 | 0.530466 | −0.056814 | −2.189545 |
| 5 | 0.004411 | 0.001663 | 0.050189 | 0.018923 | 0.007134 | 0.564581 | 0.215553 |
| 6 | 0.006292 | −0.011049 | 1.144411 | −2.009524 | 3.528615 | 0.092303 | −6.358134 |
| 7 | 0.008007 | 0.008139 | −0.061559 | −0.062574 | −0.063607 | 2.851484 | 2.833875 |
| 8 | 0.018105 | −0.010223 | 26.507156 | −14.968189 | 8.452309 | 0.778725 | −5.212624 |
| 9 | −0.036713 | 0.020233 | −27.248454 | 15.016520 | −8.275548 | −0.918950 | 5.067053 |
| 10 | 0.016708 | −0.019193 | 3.536585 | −4.062594 | 4.666837 | −0.670968 | −4.590189 |
| 11 | −0.018220 | 0.018832 | −4.471252 | 4.621541 | −4.776881 | 0.399375 | 4.524634 |
| 12 | 0.021383 | −0.007820 | 0.848449 | −0.310299 | 0.113484 | 0.053359 | −0.061019 |
| 13 | −0.007380 | −0.010181 | −0.199027 | −0.274568 | −0.378781 | −3.714082 | −5.646321 |
| Σ | 0.000210 | 0.000494 | 0.017214 | −0.066264 | 0.001101 | −0.186738 | −6.263547 |

TABLE 3

| | | | Aberration coefficient with object at −6000 | | | | |
|---|---|---|---|---|---|---|---|
| No. | L | T | SA | CM | AS | PT | DS |
| 1 | 0.010083 | −0.007392 | 4.563756 | −3.345699 | 2.452739 | 0.844279 | −2.417051 |
| 2 | 0.010904 | −0.014898 | 11.741487 | −16.041654 | 21.916701 | 0.493078 | −30.617069 |
| 3 | −0.035992 | 0.047303 | −16.037503 | 21.077766 | −27.702083 | −0.903108 | 37.595225 |
| 4 | 0.002767 | −0.015305 | 0.013420 | −0.074239 | 0.410668 | −0.056814 | −1.957433 |
| 5 | 0.004594 | 0.001592 | 0.081354 | 0.028184 | 0.009764 | 0.564581 | 0.198976 |
| 6 | 0.005921 | −0.010604 | 0.963870 | −1.726129 | 3.091206 | 0.092303 | −5.701130 |
| 7 | 0.009320 | 0.007752 | 0.102159 | 0.084977 | 0.070685 | 2.851484 | 2.430690 |
| 8 | 0.019377 | −0.010878 | 29.409650 | −16.509807 | 9.268172 | 0.778725 | −5.640065 |
| 9 | −0.039370 | 0.021587 | −30.323982 | 16.627236 | −9.117040 | −0.918950 | 5.502931 |
| 10 | 0.017312 | −0.019778 | 3.595150 | −4.107298 | 4.692405 | −0.670968 | −4.594312 |
| 11 | −0.018220 | 0.018652 | −4.471252 | 4.577306 | −4.685875 | 0.399375 | 4.388171 |
| 12 | 0.021383 | −0.007609 | 0.848449 | −0.301905 | 0.107427 | 0.053359 | −0.057213 |
| 13 | −0.007380 | −0.010254 | −0.199027 | −0.276537 | −0.384233 | −3.714082 | −5.694387 |
| Σ | 0.000699 | 0.000169 | 0.287532 | 0.012203 | 0.130537 | −0.186738 | −6.562666 |

$D_6$ = 67.63 BK = 104.42

$D_{10}$ = 3.86 f = 280

TABLE 5

| | | | Aberration coefficient with object at infinity | | | | |
|---|---|---|---|---|---|---|---|
| No. | L | T | SA | CM | AS | PT | DS |
| 1 | 0.010576 | −0.007939 | 4.929765 | −3.700307 | 2.777469 | 0.864992 | −2.734050 |
| 2 | 0.011816 | −0.015928 | 14.412282 | −19.427599 | 26.188191 | 0.504995 | −35.982122 |
| 3 | −0.038803 | 0.050466 | −19.531034 | 25.401534 | −33.036548 | −0.925307 | 44.169871 |
| 4 | 0.003763 | −0.016292 | 0.030616 | −0.132551 | 0.573877 | −0.051530 | −2.261492 |
| 5 | 0.004829 | 0.001313 | 0.072047 | 0.019585 | 0.005324 | 0.605060 | 0.165927 |
| 6 | 0.006674 | −0.011347 | 1.361521 | −2.314898 | 3.935859 | 0.096757 | −6.856373 |
| 7 | 0.007805 | 0.007934 | −0.140450 | −0.142763 | −0.145114 | 2.797608 | 2.696173 |
| 8 | 0.019170 | −0.011518 | 28.921170 | −17.377132 | 10.440957 | 0.811838 | −6.761182 |
| 9 | −0.038147 | 0.022403 | −29.769502 | 17.483426 | −10.267897 | −0.958967 | 6.593461 |
| 10 | 0.012992 | −0.019813 | 1.864805 | −2.843846 | 4.336892 | −1.008881 | −5.075248 |
| 11 | −0.015296 | 0.019591 | −2.814575 | 3.604711 | −4.616662 | 0.643595 | 5.088427 |
| 12 | 0.022053 | −0.008965 | 0.902474 | −0.366869 | 0.149138 | 0.055187 | −0.083061 |

TABLE 5-continued

| No. | L | T | SA | CM | AS | PT | DS |
|---|---|---|---|---|---|---|---|
| | | | Aberration coefficient with object at infinity | | | | |
| 13 | −0.007359 | −0.009779 | −0.182763 | −0.242872 | −0.322751 | −3.633381 | −5.257268 |
| Σ | 0.000074 | 0.000125 | 0.056356 | −0.039581 | 0.018735 | −0.198034 | −6.296939 |

TABLE 6

| No | L | T | SA | CM | AS | PT | DS |
|---|---|---|---|---|---|---|---|
| | | | Aberration coefficient with object at −6000 | | | | |
| 1 | 0.010414 | −0.007515 | 4.988580 | −3.599764 | 2.597593 | 0.864992 | −2.498605 |
| 2 | 0.011324 | −0.015129 | 12.949122 | −17.300634 | 23.114458 | 0.504995 | −31.556697 |
| 3 | −0.037394 | 0.048085 | −17.703226 | 22.764384 | −29.272471 | −0.925307 | 38.830992 |
| 4 | 0.003061 | −0.015537 | 0.017297 | −0.087799 | 0.445659 | −0.051530 | −2.000574 |
| 5 | 0.005050 | 0.001255 | 0.111966 | 0.027829 | 0.006917 | 0.605060 | 0.152109 |
| 6 | 0.006339 | −0.010881 | 1.170146 | −2.008581 | 3.447772 | 0.096757 | −6.084259 |
| 7 | 0.009300 | 0.007422 | −0.009695 | −0.007737 | −0.006175 | 2.797608 | 2.227597 |
| 8 | 0.020808 | −0.012397 | 32.946115 | −19.628492 | 11.694177 | 0.811838 | −7.450779 |
| 9 | −0.041490 | 0.024186 | −34.023660 | 19.833125 | −11.561157 | −0.958967 | 7.298250 |
| 10 | 0.013309 | −0.020326 | 1.830100 | −2.794914 | 4.268370 | −1.008881 | −4.977865 |
| 11 | −0.015296 | 0.019353 | −2.814575 | 3.560943 | −4.505234 | 0.643595 | 4.885668 |
| 12 | 0.022053 | −0.008622 | 0.902474 | −0.352835 | 0.137946 | 0.055187 | −0.075508 |
| 13 | −0.007359 | −0.009893 | −0.182763 | −0.245714 | −0.330349 | −3.633381 | −5.329002 |
| Σ | 0.000118 | 0.000001 | 0.181879 | 0.159812 | 0.037508 | −0.198034 | −6.578675 |

TABLE 7

EMBODIMENT III f = 293.1 BK = 110.76 F = 4 ω = 4.2°
fa = 270
fb = −151.4

| Lens group | Subscript number | R | D | Nd | vd |
|---|---|---|---|---|---|
| | 1 | 128.430 | 21.42 | 1.43387 | 95.1 |
| Front | 2 | −174.505 | 14.5 | | |
| lens | 3 | −144.731 | 4.03 | 1.78590 | 44.1 |
| group | 4 | −1246.09 | 10.18 | | |
| | 5 | 220.65 | 16.18 | 1.48749 | 70.1 |
| | 6 | −735.114 | *86.52 | | |
| Sub-group | 7 | 73.523 | 6. | 1.70000 | 50.3 |
| A | 8 | 468.658 | 1. | 1.75520 | 27.5 |

TABLE 7-continued

EMBODIMENT III f = 293.1 BK = 110.76 F = 4 ω = 4.2°
fa = 270
fb = −151.4

| Lens group | Subscript number | R | D | Nd | vd |
|---|---|---|---|---|---|
| | 9 | 122.354 | *3.87 | | |
| Sub-group | 10 | 82.086 | 4.5 | 1.72151 | 29.2 |
| B | 11 | 385.82 | 1. | 1.6935 | 53.3 |
| | 12 | 43.986 | | | |

Variable as with object at a distance of −6000 from the image plane
$D_6$ = 77.23 BK = 110.76
$D_9$ = 13.16 f = 284.8

TABLE 8

| No. | L | T | SA | CM | AS | PT | DS |
|---|---|---|---|---|---|---|---|
| | | | Aberration coefficient with object at infinity | | | | |
| 1 | 0.008442 | −0.003995 | 2.507492 | −1.186576 | 0.561502 | 0.690478 | −0.592452 |
| 2 | 0.011511 | −0.013573 | 12.236944 | −14.429485 | 17.014873 | 0.508168 | −20.662714 |
| 3 | −0.037783 | 0.042828 | −16.231970 | 18.399703 | −20.856932 | −0.891076 | 24.652392 |
| 4 | 0.007783 | −0.018444 | 0.141055 | −0.356129 | 0.899139 | 0.103496 | −2.531408 |
| 5 | 0.003198 | 0.003320 | −0.002090 | −0.002170 | −0.002253 | 0.435284 | 0.449619 |
| 6 | 0.006877 | −0.010403 | 1.285462 | −1.944523 | 2.941488 | 0.130654 | −4.647241 |
| 7 | 0.003283 | 0.010633 | −0.068801 | −0.222824 | −0.721656 | 1.641317 | 2.978488 |
| 8 | −0.008852 | 0.008755 | −0.083915 | 0.082994 | −0.082083 | 0.011568 | 0.069740 |
| 9 | 0.005920 | −0.019466 | 0.174588 | −0.574120 | 1.887945 | −1.030585 | −2.819156 |
| 10 | −0.001883 | 0.018257 | −0.019196 | 0.186153 | −1.805261 | 1.496341 | 2.995809 |
| 11 | 0.007856 | −0.006740 | 0.054810 | −0.047023 | 0.040342 | −0.007298 | −0.028349 |
| 12 | −0.005521 | −0.011351 | 0.036927 | 0.075926 | 0.156111 | −2.728442 | −5.288958 |
| Σ | 0.000355 | −0.000179 | 0.031308 | −0.018073 | 0.033216 | 0.359906 | −5.424430 |

TABLE 9

| No. | L | T | SA | CM | AS | PT | DS |
|---|---|---|---|---|---|---|---|
| | | | Aberration coefficient with object at −6000 | | | | |
| 1 | 0.008495 | −0.003817 | 2.677458 | −1.203010 | 0.540525 | 0.690478 | −0.553102 |
| 2 | 0.011203 | −0.013003 | 11.324919 | −13.144543 | 15.256533 | 0.508168 | −18.297684 |
| 3 | −0.036974 | 0.041156 | −15.148896 | 16.862616 | −18.770199 | −0.891076 | 21.885458 |
| 4 | 0.006637 | −0.017733 | 0.103623 | −0.276872 | 0.739778 | 0.103496 | −2.253155 |
| 5 | 0.003492 | 0.003200 | 0.012107 | 0.011095 | 0.010168 | 0.435284 | 0.408234 |
| 6 | 0.006635 | −0.010054 | 1.139042 | −1.725904 | 2.615133 | 0.130654 | −4.160483 |
| 7 | 0.005173 | 0.010128 | −0.108275 | −0.211981 | −0.415017 | 1.641317 | 2.400856 |
| 8 | −0.01044 | 0.010026 | −0.100951 | 0.099775 | −0.098613 | 0.011568 | 0.086031 |
| 9 | 0.005380 | −0.020350 | 0.123586 | −0.467495 | 1.768420 | −1.030585 | −2.791051 |
| 10 | −0.001883 | 0.018249 | −0.019196 | 0.186066 | −1.803568 | 1.496341 | 2.977991 |
| 11 | 0.007856 | −0.006704 | 0.054810 | −0.046773 | 0.039915 | −0.007298 | −0.027835 |
| 12 | −0.005521 | −0.011376 | 0.036927 | 0.076094 | 0.156803 | −2.728442 | −5.299234 |

TABLE 9-continued

| No. | L | T | SA | CM | AS | PT | DS |
|---|---|---|---|---|---|---|---|
| | | | Aberration coefficient with object at −6000 | | | | |
| Σ | 0.000351 | −0.000278 | 0.095155 | 0.159067 | 0.039879 | 0.359906 | −5.623974 |

TABLE 10

EMBODIMENT IV f = 292.9 BK = 111.49 F = 4 ω = 4.2°
fa = 450
fb = −210.3

| Lens group | Subscript number | R | D | Nd | vd |
|---|---|---|---|---|---|
| | 1 | 129.583 | 21.42 | 1.43387 | 95.1 |
| Front | 2 | −174.706 | 14.61 | | |
| lens | 3 | −144.791 | 4.03 | 1.78590 | 44.1 |
| group | 4 | −1277.754 | 10.2 | | |
| | 5 | 220.517 | 16.28 | 1.48749 | 70.1 |
| | 6 | −711.03 | *85.19 | | |
| | 7 | 97.188 | 7. | 1.70000 | 48. |
| Sub-group | 8 | 334.272 | 1. | 1.75520 | 27.5 |
| A | 9 | 141.938 | *5.59 | | |
| | 10 | 72.375 | 4.5 | 1.72151 | 29.2 |
| Sub-group | 11 | 137.114 | 1. | 1.69350 | 53.3 |
| B | 12 | 46.221 | | | |

*Variable as with object at a distance of −6000 from the image plane
$D_6$ = 69.52 f = 286.5
$D_9$ = 21.26 BK = 111.49

TABLE 11

| No. | L | T | SA | CM | AS | PT | DS |
|---|---|---|---|---|---|---|---|
| | | | Abberation coefficient with object at infinity | | | | |
| 1 | 0.008363 | −0.003893 | 2.437081 | −1.134547 | 0.528172 | 0.683953 | −0.564287 |
| 2 | 0.011473 | −0.013501 | 12.094969 | −14.232439 | 16.747651 | 0.507301 | −20.304314 |
| 3 | −0.037668 | 0.042587 | −16.054738 | 18.151564 | −20.522245 | −0.890210 | 24.209025 |
| 4 | 0.007107 | −0.013259 | 0.129704 | −0.333242 | 0.856182 | 0.100876 | −2.458919 |
| 5 | 0.003269 | 0.003280 | 0.000734 | 0.000737 | 0.000739 | 0.435307 | 0.437473 |
| 6 | 0.006903 | −0.010392 | 1.290838 | −1.943138 | 2.925066 | 0.135004 | −4.606420 |
| 7 | 0.001356 | 0.010942 | −0.013703 | −0.110589 | −0.892484 | 1.240967 | 2.812342 |
| 8 | −0.006393 | 0.008704 | −0.039244 | 0.053428 | −0.072738 | 0.016210 | 0.076958 |
| 9 | 0.005323 | −0.019643 | 0.121951 | −0.450028 | 1.660707 | −1.887897 | −2.851847 |
| 10 | 0.001237 | 0.019034 | −0.006274 | −0.096533 | −1.485304 | 1.696179 | 3.244616 |
| 11 | 0.004480 | −0.007680 | 0.014013 | −0.024025 | 0.041189 | −0.020524 | −0.035428 |
| 12 | −0.005171 | −0.011322 | 0.051648 | 0.113086 | 0.247605 | −2.595031 | −5.139760 |
| Σ | 0.000279 | −0.000143 | 0.026978 | −0.005727 | 0.034539 | 0.422135 | −5.180563 |

TABLE 12

| No. | L | T | SA | CM | AS | PT | DS |
|---|---|---|---|---|---|---|---|
| | | | Aberration coefficient with object at −6000 | | | | |
| 1 | 0.008514 | −0.003720 | 2.665160 | −1.164567 | 0.508868 | 0.683953 | −0.521215 |
| 2 | 0.011295 | −0.012936 | 11.451401 | −13.115222 | 15.020786 | 0.507301 | −17.784226 |
| 3 | −0.037287 | 0.040933 | −15.329996 | 16.828917 | −18.474398 | −0.890210 | 21.258022 |
| 4 | 0.006514 | −0.017559 | 0.096645 | −0.260516 | 0.702248 | 0.100876 | −2.164901 |
| 5 | 0.003605 | 0.003162 | 0.016423 | 0.014405 | 0.012636 | 0.435307 | 0.392913 |
| 6 | 0.006739 | −0.010045 | 1.170924 | −1.745340 | 2.601546 | 0.135004 | −4.079010 |
| 7 | 0.003395 | 0.010415 | −0.056606 | −0.173645 | −0.532681 | 1.240967 | 2.172764 |
| 8 | −0.007560 | 0.010196 | −0.048019 | 0.064760 | −0.087337 | 0.016210 | 0.095923 |
| 9 | 0.004540 | −0.020771 | 0.071149 | −0.325541 | 1.489518 | −0.887897 | −2.752723 |
| 10 | 0.001237 | 0.019050 | −0.006274 | −0.096614 | −1.487775 | 1.696179 | 3.209268 |
| 11 | 0.004480 | −0.007623 | 0.014013 | −0.023845 | 0.040576 | −0.020524 | −0.034122 |
| 12 | −0.005171 | −0.011389 | 0.051648 | 0.113746 | 0.250506 | −2.595031 | −5.163396 |
| Σ | 0.000300 | −0.000288 | 0.096469 | 0.116538 | 0.044493 | 0.422135 | −5.370701 |

It will be seen from the foregoing description that the present invention provides a telephoto lens with its rear lens group being divided into at least two sub-groups one of which is stationary during focusing and the other of which is axially movable to effect focusing, thereby it being made possible to achieve high speed focusing adjustment by use of an operating mechanism of far simpler construction than was heretofore required. In addition thereto, the arrangement of the sub-groups in the rear lens group is such as to give a high standard of stabilization of the various image aberrations throughout the focusing range so that the first sub-group counting from the front is selected as movable for focusing and as having a positive refracting power with its most convergent surface being convex toward the front, and the rearmost sub-group is selected as stationary during focusing and as having a negative refracting power, with its most divergent surface being concave toward the image.

What is claimed is:

1. A high speed focusing telephoto lens comprising: a front lens group which has a positive refracting power and remains stationary during focusing; and a rear lens group having a negative refracting power and consisting of at least one stationary sub-group and at least one movable sub-group having a positive refracting power, said movable sub-group being moved on the optical axis toward an object so as to cause said telephoto lens to focus an object at near distance from its focusing on an object at far distance.

2. A high speed focusing telephoto lens according to claim 1, in which said movable sub-group has a most convergent surface convex toward the object.

3. A high speed focusing telephoto lens according to claim 1, in which said stationary sub-group has a most divergent surface concave toward the image.

4. A high speed focusing telephoto lens comprising: a front lens group which has a positive refracting power and remains stationary during focusing; and a rear lens group having a negative refracting power and consisting of at least one stationary sub-group and at least one movable sub-group having a positive refracting power, said movable sub-group being moved on the optical axis toward an object so as to cause said telephoto lens to focus an object at near distance from its focusing on an object at far distance, and wherein said stationary sub-group is arranged nearer an image than said movable sub-group.

5. A high speed focusing telephoto lens according to claim 4, in which said movable sub-group has a front surface convex toward the object, and said stationary sub-group has a rear surface concave to the image.

6. A high speed focusing telephoto lens according to claim 5, in which said movable sub-group consists of a plurality of lenses.

7. A high speed focusing telephoto lens comprising: a front lens group which has a positive refracting power and remains stationary during focusing; and a rear lens group having a negative refracting power and consisting of at least one stationary sub-group and at least one movable sub-group having a positive refracting power, said movable sub-group being moved on the optical axis toward an object so as to cause said telephoto lens to focus an object at near distance from its focusing on an object at far distance, and wherein said stationary sub-group and said movable sub-group each consist of at least one positive lens and at least one negative lens, the average Abbe number $Vb_1$ of the positive lenses in said stationary sub-group is smaller than the average Abbe number $Vb_2$ of the negative lenses, and the average Abbe number $Va_1$ of the positive lenses in said movable sub-group is larger than the average Abbe number $Va_2$ of the negative lenses.

8. A high speed focusing telephoto lens comprising: a front lens group which has a positive refracting power and remains stationary during focusing; and a rear lens group having a negative refracting power and consisting of at least one stationary sub-group and at least one movable sub-group having a positive refracting power, said movable sub-group being moved on the optical axis toward an object so as to cause said telephoto lens to focus an object at near distance from its focusing on an object at far distance, and wherein said front lens group has a positive lens member, a negative lens member and a positive lens member, and is followed by a movable sub-group in axially spaced relation thereto; and on the image side of this movable sub-group is a negative stationary sub-group.

9. A telephoto lens according to claim 8, in which said movable sub-group and said stationary sub-group each consist of a bi-convex lens and a bi-concave lens.

10. A telephoto lens according to claim 8, in which said movable sub-group and said stationary sub-group each consist of a meniscus positive lens and a meniscus negative lens.

11. A telephoto lens comprising: a front lens group which has a positive refracting power and remains stationary during focusing; and a rear lens group axially spaced from said front lens group, having a negative refracting power and consisting of at least one movable sub-group and a stationary sub-group; the convergent surface having the smallest radius of curvature in said movable sub-group is convex toward the object; and said movable sub-group being moved on the optical axis toward an object so as to cause said telephoto lens to focus an object at infinite distance from its focusing on an object at finite distance.

12. A telephoto lens comprising: a front lens group which has a positive refracting power and remains stationary during focusing; and a rear lens group axially spaced from said front lens group, having a negative refracting power and consisting of at least one movable sub-group and another sub-group; the convergent surface having the smallest radius of curvature in said movable sub-group is convex toward the object; and said movable sub-group being moved on the optical axis toward an object so as to cause said telephoto lens to focus an object at infinite distance from its focusing on an object at finite distance, and wherein between said movable sub-group and the image plane is a stationary sub-group, and the divergent surface having a smallest radius of curvature in this stationary sub-group is concave to the image plane.

13. A telephoto lens comprising: a primary lens part which consists of a plurality of lenses, which has a positive refracting power and which remains stationary during focusing; and a movable sub-group on the image side of said primary lens part, said movable sub-group being followed by a fixed rearmost sub-group, the compound refracting power of said movable sub-group and said rearmost sub-group being negative, whereby the focusing of said telephoto lens is effected by axially moving said movable sub-group.

14. A telephoto lens according to claim 13, in which said movable sub-group has a positive refracting power, and the converging surface having a smallest radius of curvature in this sub-group is convex toward the object.

15. A telephoto lens according to claim 13, in which said primary lens part includes two positive lens members and a negative lens member; and the axial distance between said primary lens part and said movable sub-group is longer than that between said movable sub-group and said rearmost sub-group even when said movable sub-group is positioned at the front end of the focusing range.

16. A telephoto lens according to claim 15, in which said primary lens part consists of a positive lens, a negative lens and a positive lens.

17. A telephoto lens comprising: a primary lens part which consists of a plurality of lenses, which has a positive refracting power and which remains stationary during focusing; and a movable sub-group on the image side of said primary lens part, said movable sub-group being followed by a fixed rearmost sub-group, the compound refracting power of said movable sub-group and said rearmost sub-group being negative, whereby the focusing of said telephoto lens is effected by axially moving said movable sub-group, and wherein the diverging surface having a smallest radius of curvature in said rearmost sub-group is convex toward the object.

18. A telephoto lens comprising: a primary lens part which consists of a plurality of lenses, which has a positive refracting power and which remains stationary during focusing; and a movable sub-group on the image side of said primary lens part, said movable sub-group being followed by a fixed rearmost sub-group, the compound refracting power of said movable sub-group and said rearmost sub-group being negative, whereby the focusing of said telephoto lens is effected by axially moving said movable sub-group, said primary lens part includes two positive lens members and a negative lens member; and the axial distance between said primary lens part and said movable sub-group is longer than that between said movable sub-group and said rearmost sub-group even when said movable sub-group is positioned at the front end of the focusing range, and wherein said movable sub-group consists of a positive lens having a front surface convex toward the object and a negative lens; and said rearmost sub-group consists of a positive lens and a negative lens having a rear surface concave toward the image.

*19. A telephoto lens comprising: a front lens group which has a positive power and remains stationary during focusing; and a rear lens group having a negative power and including at least one movable sub-group and a rearmost sub-group having a negative power, whereby the focusing of said telephoto lens is effected by axially moving said movable sub-group and said rearmost sub-group remains stationary during focusing.*

*20. A telephoto lens according to claim 19, in which said movable sub-group has a positive power.*

*21. A telephoto lens according to claim 20, in which said movable sub-group is shifted toward an object as said telephoto lens is refocused from an object at a far distance to an object at a close distance.*

*22. A telephoto lens according to claim 19, in which said movable sub-group includes a positive lens and a negative lens.*

*23. A telephoto lens according to claim 19, in which said rearmost sub-group includes a positive lens and a negative lens.*

*24. A telephoto lens according to claim 19, in which an axial distance between the frontmost lens surface of said front lens group and the frontmost lens surface of said movable sub-group is longer than that between the rearmost lens surface of said movable sub-group and the image surface of said telephoto lens even when said telephoto lens is focused on an object at infinite distance.*

*25. A telephoto lens comprising: a front lens group which consists of a plurality of lenses, which has a positive refracting power and which remains stationary during focusing; and a movable sub-group on the image side of said front lens group, said movable sub-group being followed by a fixed rearmost sub-group, the compound refracting power of said movable sub-group and said rearmost sub-group being negative, whereby the focusing of said telephoto lens is effected by axially moving said movable sub-group.*

*26. A telephoto lens according to claim 25, in which an axial distance between the frontmost lens surface of said front lens group and the frontmost lens surface of said movable sub-group is longer than that between the rearmost lens surface of said movable sub-group and the image surface of said telephoto lens even when said telephoto lens is focused on an object at infinite distance.*

*27. A telephoto lens according to claim 26, in which said front lens group consists of two positive lens and a negative lens.*

*28. A telephoto lens comprising: a front lens group which consists of a plurality of lenses, which has a positive refracting power and which remains stationary during focusing; and a movable sub-group on the image side of said front lens group, said movable sub-group being followed by a fixed rearmost sub-group, the compound refracting power of said movable sub-group and said rearmost sub-group being negative, whereby the focusing of said telephoto lens is effected by axially moving said movable sub-group, and wherein the diverging surface having a smallest radius of curvature in said rearmost sub-group is convex toward the object.*

*29. A telephoto lens comprising: a front lens group which consists of a plurality of lenses, which has a positive refracting power and which remains stationary during focusing; and a movable sub-group on the image side of said front lens group, said movable sub-group being followed by a fixed rearmost sub-group, the compound refracting power of said movable sub-group and said rearmost sub-group being negative, whereby the focusing of said telephoto lens is effected by axially moving said movable sub-group, said front lens group includes two positive lens members and a negative lens member; and the axial distance between the frontmost lens surface of said front lens group and the frontmost lens surface of said movable sub-group is longer than that between the rearmost lens surface of said movable sub-group and the image surface of said telephoto lens when said movable sub-group is positioned at the rear end of the focusing range, and wherein said movable sub-group consists of a positive lens and a negative lens; and said rearmost sub-group consists of a positive lens and a negative lens.*

* * * * *